United States Patent [19]

Niioka

[11] Patent Number: 5,021,205
[45] Date of Patent: Jun. 4, 1991

[54] CONCRETE MANUFACTURING PROCESS

[75] Inventor: Yoshio Niioka, 40, Oaza-kunotsuboyama, Nishiharu-cho, Nishikasuga-gun, Japan

[73] Assignees: Yoshio Niioka, Aichi, Japan; Marvin Gottlieb, Hiland Park, Ill.

[21] Appl. No.: 607,450

[22] Filed: Oct. 31, 1990

[30] Foreign Application Priority Data

Nov. 1, 1989 [JP] Japan .................... 1-286160

[51] Int. Cl.⁵ .................... B28B 1/08; B28B 3/02; B29C 43/02; B29C 43/32
[52] U.S. Cl. .................... 264/69; 264/82; 264/85; 264/333; 264/500
[58] Field of Search .................... 264/69, 71-72, 264/82, 85, 500, 333

[56] References Cited

U.S. PATENT DOCUMENTS

| | | | |
|---|---|---|---|
| 2,057,466 | 10/1936 | Willets | 264/71 |
| 2,850,786 | 9/1958 | Dubbs | 264/85 X |
| 3,712,785 | 1/1973 | Hirt et al. | 264/71 X |
| 3,959,422 | 5/1976 | Willhelm | 264/23 |
| 4,079,109 | 3/1978 | Helmrich et al. | 264/72 |
| 4,725,220 | 2/1988 | Percinel et al. | 264/72 X |
| 4,746,481 | 5/1988 | Schmidt | 264/82 |

Primary Examiner—Jan H. Silbaugh
Assistant Examiner—Karen D. Kutach
Attorney, Agent, or Firm—Koda and Androlia

[57] ABSTRACT

A concrete manufacturing process includes pouring a fluidized cement containing a short fiber as an admixture into a concrete manufacturing mold; applying a predetermined level or levels of pressure to the entire fluidized cement poured into the mold, while a gas is introduced into the cement; and hardening the cement as the gas introduced thereto forms bubbles which burst and generate vibration when they are vented through a venting section provided for the mold. When the cement is hardened to some degree, the hardening may be continued in a temperature-controlled liquid bath or followed by curing with steam.

4 Claims, 7 Drawing Sheets

CONCRETE MANUFACTURING PROCESS

BACKGROUND OF THE INVENTION

This invention relates to a concrete manufacturing process, more particularly to a concrete manufacturing process which can yield high compressive strength about twice as strong as the conventional concrete products and in turn enables formation of products, using concrete, which have conventionally been molded with metals.

It is widely known as a conventional method of increasing compressive strength of concrete to incorporate steel bars into concrete. This method, however, involves a problem in that the surface of concrete is easily damaged due to its brittleness, although a high degree of buckling resistance may be obtained. As a countermeasure for simultaneously achieving prevention of surface damage and improvement of compressive strength, it is known to incorporate a short fiber into cement before it is hardened, and a considerable effect is yielded thereby.

By the way, for example, in those industries where press molding is inevitable, metallic molds are conventionally used. However, if a complicated shape is to be molded, it is generally difficult to make molds using a metal and requires much time and cost, disadvantageously. While the above problems can be solved if concrete molds can be used for such press molding, sufficient strength comparable to metals has not yet been achieved in concrete at the current level of concrete engineering.

Therefore, it is an object of this invention to provide a process for manufacturing concrete having sufficient strength so as to be used in place of metallic materials.

SUMMARY OF THE INVENTION

To describe in detail, the concrete manufacturing process according to this invention comprises: pouring a fluidized cement containing a short fiber as an admixture into a concrete manufacturing mold; applying a predetermined level or levels of pressure to the entire fluidized cement poured into the mold using, for example, a hydraulic press, while a gas is introduced into said cement; and hardening said cement as the gas introduced thereto is vented through a venting section provided for said mold.

According to the present concrete manufacturing process, sufficient compressive strength is achieved in the resulting concrete product without using any reinforcing member such as steel bars. Therefore, if a press mold as described above is made by concrete according to the present process, it can be used in place of metallic press mold since it has sufficient compressive strength. Further, various types of industrial wastes can be packed into concrete containers having been made according to the present process, which can then likewise be made into concrete blocks for direct disposal inland or underseas. Namely, the concrete blocks manufactured according to the present process is not only free from the fear of secondary pollution without application of any waste disposal treatment such as application of water-barrier sheet since it has sufficiently high compressive strength but also simplifies the procedures required for the waste disposal. Moreover, such concrete blocks can be utilized as a sheathing material to provide for typhoon, an erosion preventive material to prevent the shoreline from erosion by waves and winds, and also for the protection of excavated earth surface or banking for antiflood afforestation and of slope surfaces of river banks and the like.

PREFERRED EMBODIMENT OF THIS INVENTION

The concrete manufacturing process according to this invention will be described by way of a preferred embodiment referring to the attached drawings.

Figure 1:
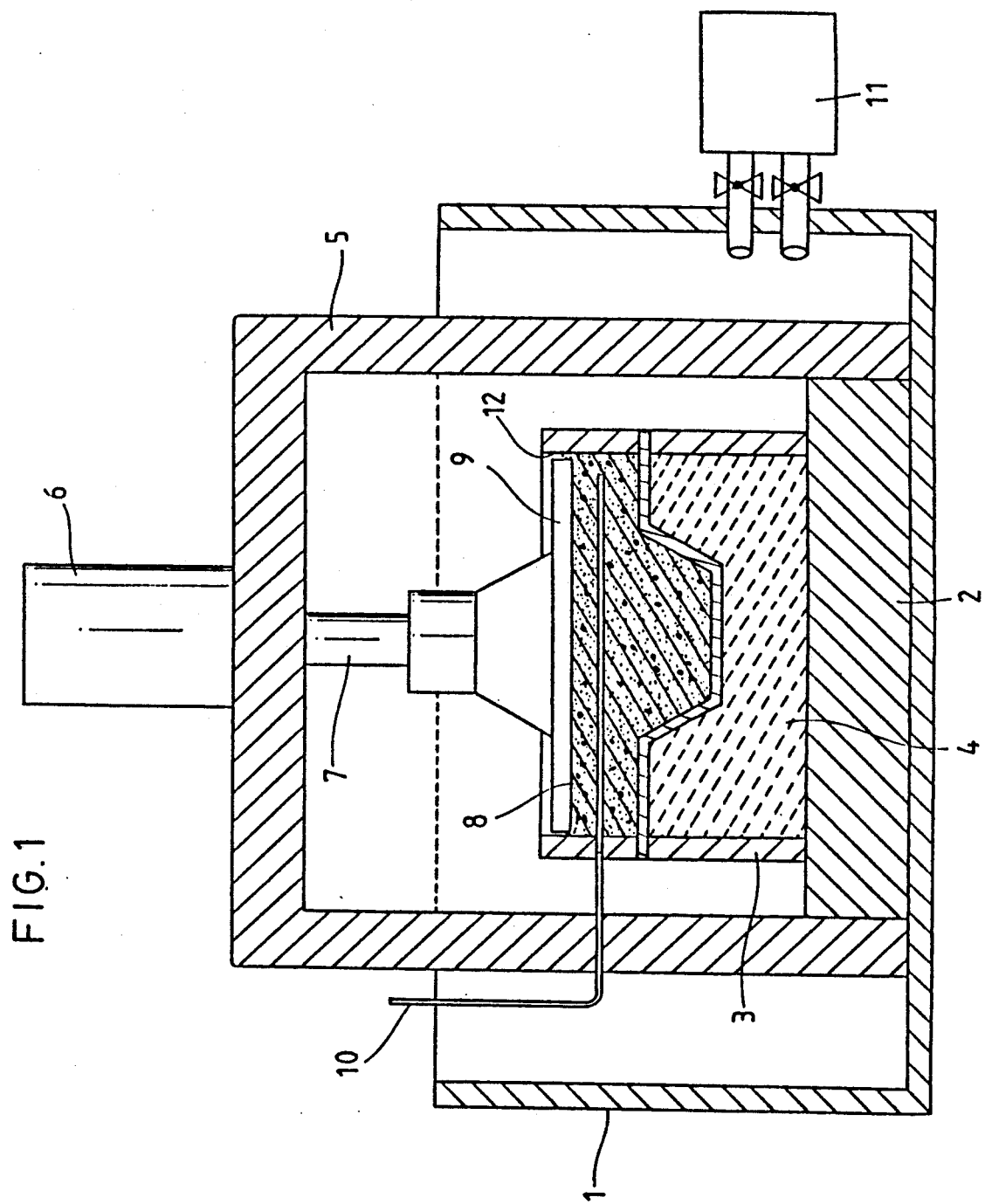
FIG. 1 is a schematic illustration of an apparatus for practicing the concrete manufacturing process according to this invention.

FIG. 1 shows a schematic illustration of an apparatus for practicing the concrete manufacturing process according to this invention; wherein a large-scale water tank is shown with the reference number 1, in which a concrete manufacturing mold 3 is installed through a base 2. A gypsum model 4 having a surface configuration conforming to that of the concrete product to be manufactured is set in the mold 3.

In the water tank 1, a frame 5 stands upright to entirely surround the mold 3, and a hydraulic cylinder 6 is mounted vertically on the top of the frame 5. The piston rod 7 of the hydraulic cylinder 6 is extended into the upper space in the mold 3. A pressure plate 9 is attached horizontally to the end of the piston rod 7, so that a fluidized cement 8 which has been poured into the mold 3 may be powerfully pressed with said pressure plate 9. As will be described later, the fluidized cement 8 comprises cement and admixtures of one or more short fibers such as a metal fiber, a glass fiber, a Kevlar chop and other arbitrary fibers. A gas introducing pipe 10 is disposed in such a way that the openings thereof may open to the inside of the mold 3 to introduce a gas to the fluidized cement 8 poured into said mold 3. The water tank 1 also has a boiler 11 for heating a predetermined amount of water to be carried in said tank 1.

Procedures of practicing the concrete manufacturing process according to this invention using the apparatus shown in FIG. 1 will now be described. First, it should be appreciated that the water tank 1 is not filled with water. A fluidized cement 8 is prepared by mixing cement with one or more short fibers as admixtures selected arbitrarily from a metal fiber, a glass fiber, a Kevlar chop, etc. and a predetermined amount of the thus prepared fluidized cement 8 is poured into the above concrete manufacturing mold 3. Subsequently, the hydraulic cylinder 6 is operated to apply a predetermined level of pressure to the entire fluidized cement 8 through the pressure plate 9 attached to the piston rod 7, while air is forcedly introduced through the pipe 10 into the fluidized cement 8 contained in the mold 3.

Incidentally, a small gap 12 is provided between the vertical wall surface and the pressure plate 9, and this gap 12 serves as a vent. Accordingly, the bubbles formed by the air introduced into the fluidized cement 8 are allowed to escape through the gap 12, and the fluidized cement 8 is hardened with the predetermined level of pressure being applied to the entire fluidized cement 8 through the pressure plate 9.

When a pressure is applied entirely to the short fiber-containing fluidized cement 8 while air is introduced thereinto, the adhesion or affinity between the short fiber and the cement 8 is improved while the introduced air migrates through the cement 8 assuming a form of bubble. The bubbles floating up through the fluidized cement 8 burst as soon as they are released into atmosphere, and the vibration generated upon this bursting further improves affinity between the short fiber and the cement 8, as well as, concrete density and in turn compressive strength thereof greatly.

When the concrete is substantially solidified, water is poured into the water tank 1 to provide a cold water bath to keep the concrete therein, for example, for 24 hours. The water in the water tank 1 is then heated, for example, to 35° to 45° C. by the boiler 11 to provide a warm water bath to keep the concrete therein, for example, for 48 hours. The concrete block is then removed from the mold 3. The concrete block 3 may be cured by introducing steam into the closed mold 3 instead of providing cold bath and warm bath and maintaining this state for a predetermined time.

When a press mold is formed according to the above process, it can be used for forming a thin plate instead of using metallic mold since it has sufficient compressive strength. Further, industrial wastes may be packed into for antiflood afforestation and slope surfaces of river banks and the like.

Figure 3:
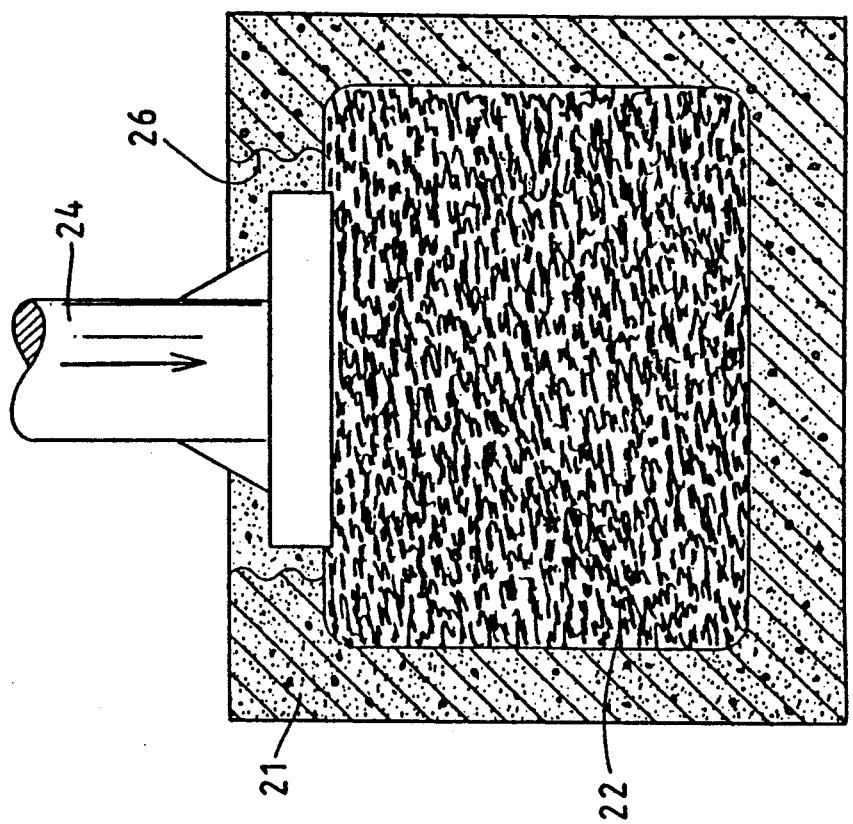
FIGS. 3 and 4 show, in vertical cross-sectional front views, a process of sealing a waste into the concrete block or container.
Figure 2:
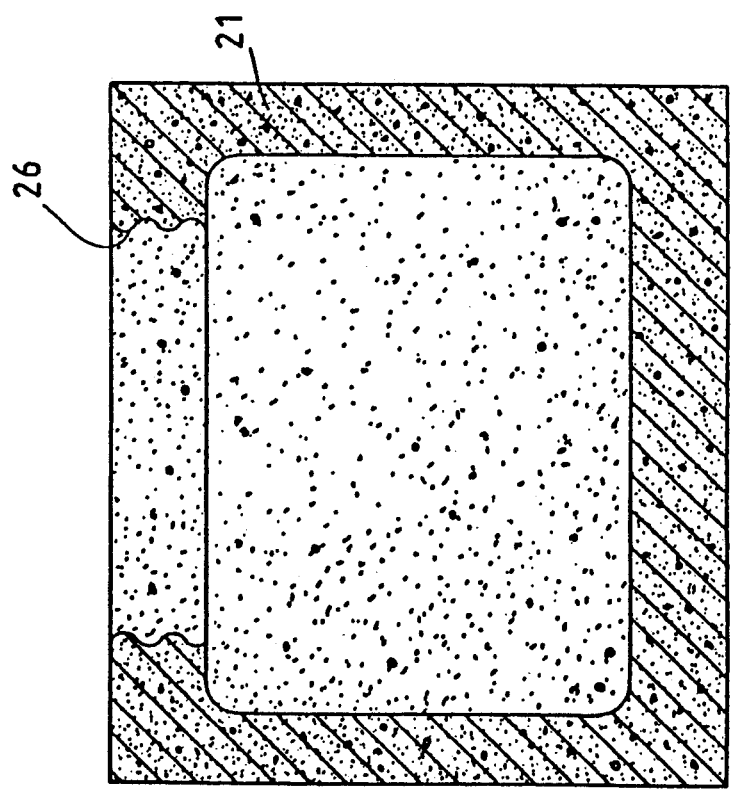
FIG. 2 shows a vertical cross-sectional front view of a box concrete container manufactured according to the process of this invention.

FIG. 2 shows an open-top box concrete container 21 manufactured by pouring the fluidized cement according to the process of the preferred embodiment. The container 21 not only has a compressive strength about twice as strong as that of the conventional concrete but also is of substantially leak free construction. A waste 22 is packed into the box concrete container 21 and compressed until no cavities may be left therein, as shown in FIG. 3, and then a portion of concrete is poured into the opening of the container 21 to form a closure 23. The pressurization is further continued as such under high pressure until the finally poured portion of concrete is solidified, whereby a concrete block 25 packed with the waste 22, having high strength and in a substantially leak free state can be formed.

Figure 4:
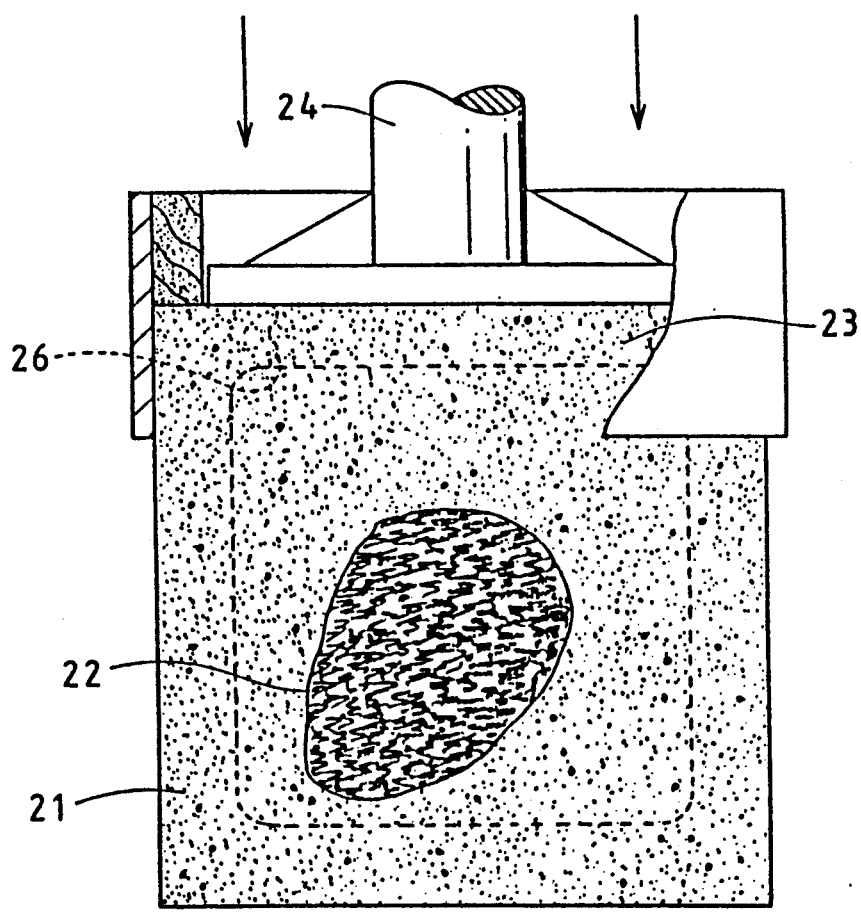
Figure 5:
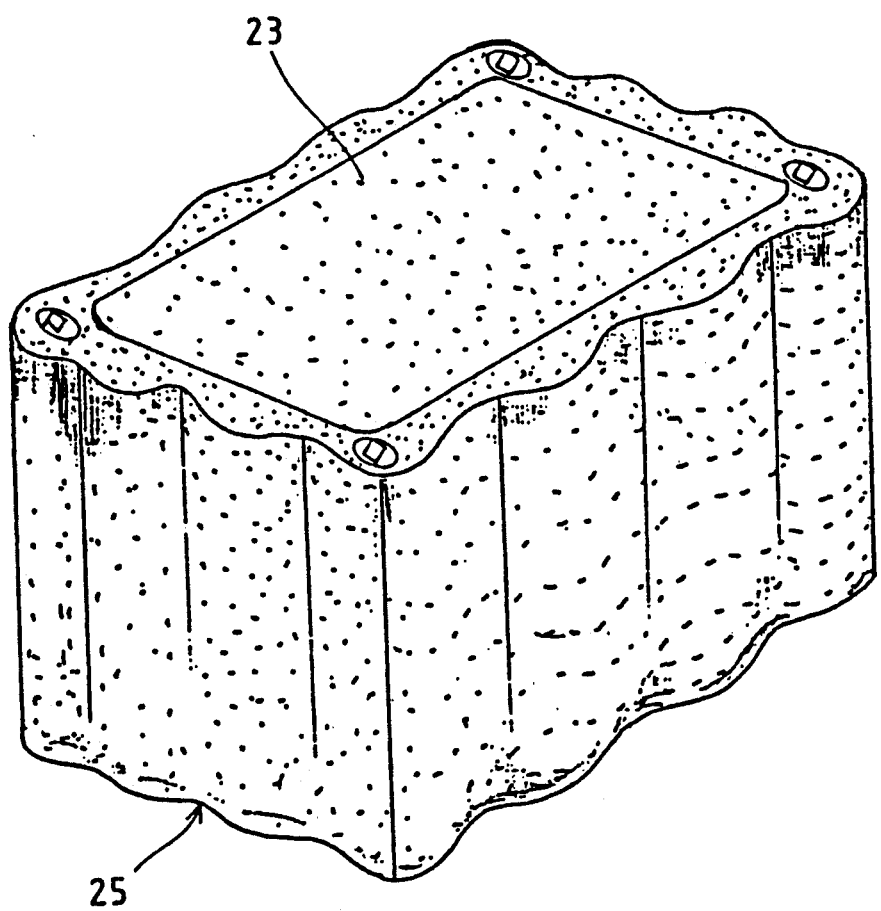
FIG. 5 shows a perspective view of the concrete block obtained after the waste sealing process shown in FIGS. 3 and 4.

In this case, both of the box concrete container 21 and the closure 23 preferably have at least a W-shaped cross section or a zigzag cross section comprising more than two V-shaped projections so that they may be engaged with each other with these projections. While the concrete block 25 packed with the waste 22 may have flat external surfaces as shown in FIGS. 2 to 4, it may also have a wavy cross section as shown in FIG. 5, or other cross sections comprising substantially conical or semicircular protrusions. The concrete block 25 may have through holes (not shown) for inserting therein supporting rods for immobilizing it on the ground or sea bed. In order to further enhance the compressive strength of said container 21, the inside of the box concrete container 21 may have integrally molded partitions of arbitrary structures including planar honeycomb structure or the external walls of the container 21 may be allowed to have a honeycomb structure.

The test data for the strength of concrete block are shown in Table 1.

TABLE 1

| | Details of specimen and Breaking strength | | |
| --- | --- | --- | --- |
| | Specimen | | |
| Item | A | B | C |
| Type | Strongest concrete material | Reinforced concrete material | Common concrete material |
| Dimensions | | 101.0 diameter × 90.1 | |
| Weight (kg) | 2.175 | 2.172 | 1.925 |
| Density (g/cm$^3$) | 3.01 | 3.01 | 2.67 |
| State of damage | Probability of unparallelism present between the tester and specimen seems to be high judging from the state of damage. Actual breaking load seems to be greater than the measured value | Oblique cracking occurred heavily. | Vertical wrinkling occurred and collasped soundlessly |
| Compressive strength | A. 98 ton (1223 kgf/cm$^2$), Crushing sound occurred. B. 101.4 ton (1266 kgf/cm$^2$) Crushed with extremely great sound. | A. 102.0 ton (1273 kgf/cm$^2$) Crushing sound occurred. B. 108.3 ton (1352 kgf/cm$^2$) Crushed with great sound. | 57.7 ton (720 kgf/cm$^2$) Crushed |

Figure 6:
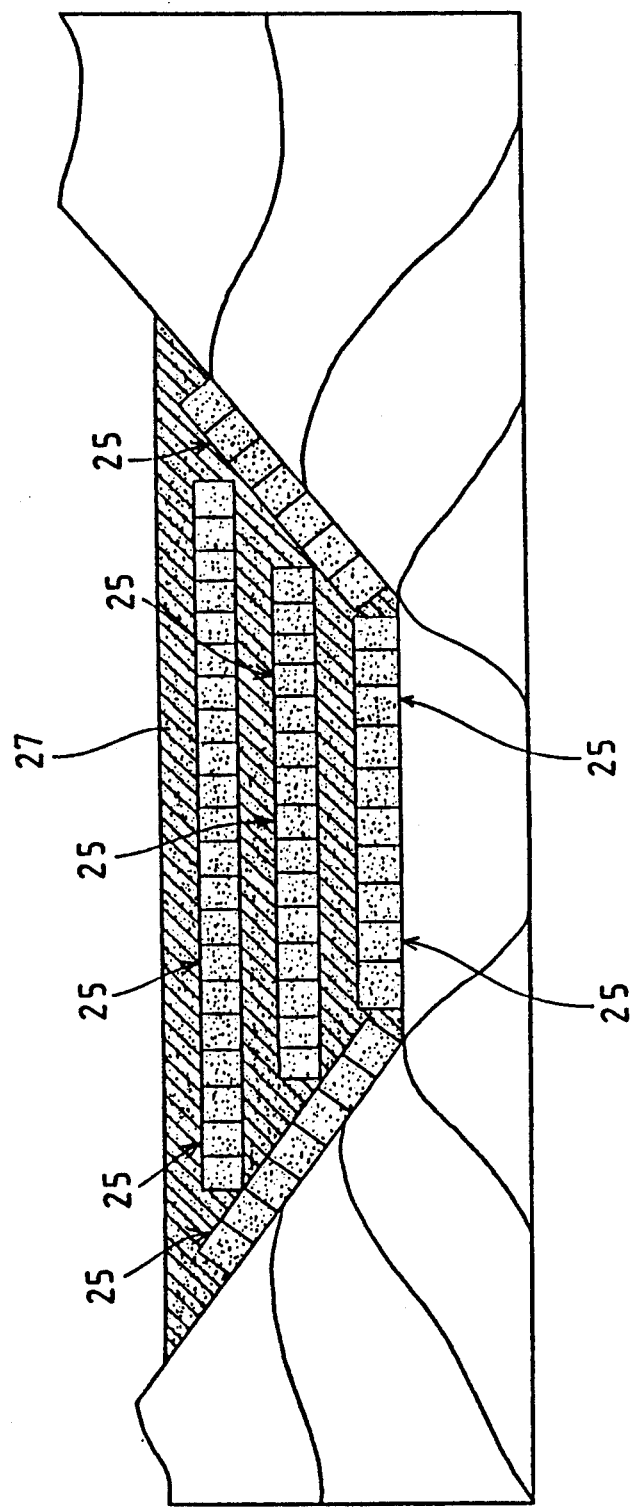
FIG. 6 illustrates, in front view, piles of the concrete blocks which are reutilized.
Figure 7:
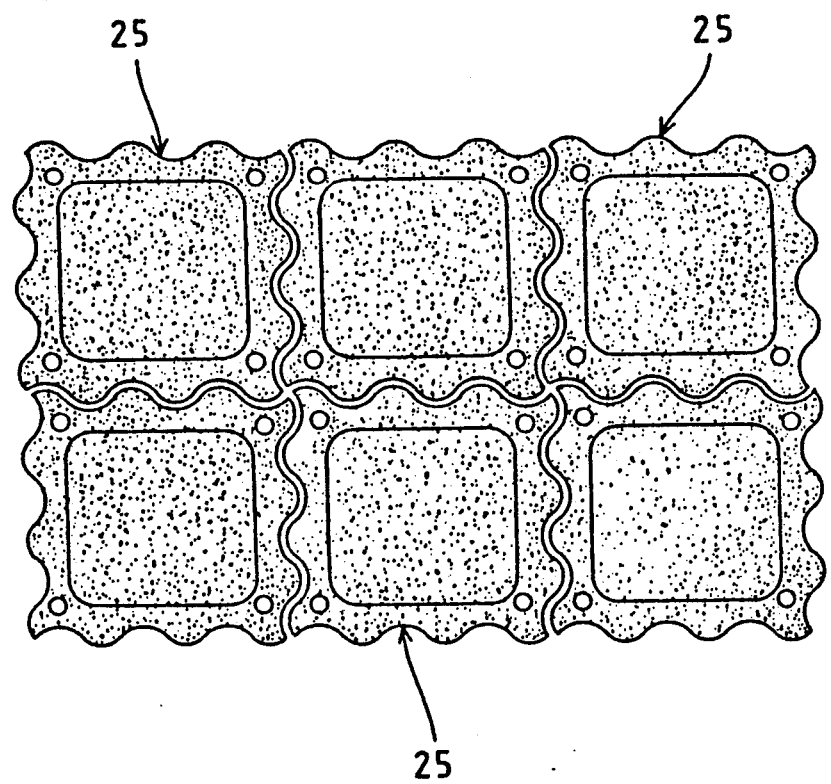
FIG. 7 shows, in plan view, how the concrete blocks are combined one another.

(Note) 200-Ton Buckling Tester manufactured by Maekawa Shikenki was used.

concrete containers manufactured according to the above process and closed in the same manner as described above to form concrete blocks for disposal inland or underseas. In the latter case, there is no fear of secondary pollution even if water-barrier sheet for waste disposal is not applied. Moreover, such concrete blocks can be utilized as a sheathing material to provide for typhoon, an erosion preventive material to prevent the shoreline from erosion by waves and winds, and also for the protection of excavated earth surface or banking On the other hand, if the concrete blocks 25 are combined in such a way that the projections formed on the outer surfaces of the box concrete containers 21 may engage with one another, as shown in FIGS. 6 and 7, and are stacked on alternatively with the layer of earth 27 taking drainage into consideration, they can be utilized as a sheathing material to provide for typhoon, an erosion preventive material to prevent the shoreline from erosion by waves and winds, and also for the protection of excavated earth surface or banking in general roads and highways and slope surfaces of river banks and the like.

Figure 8:
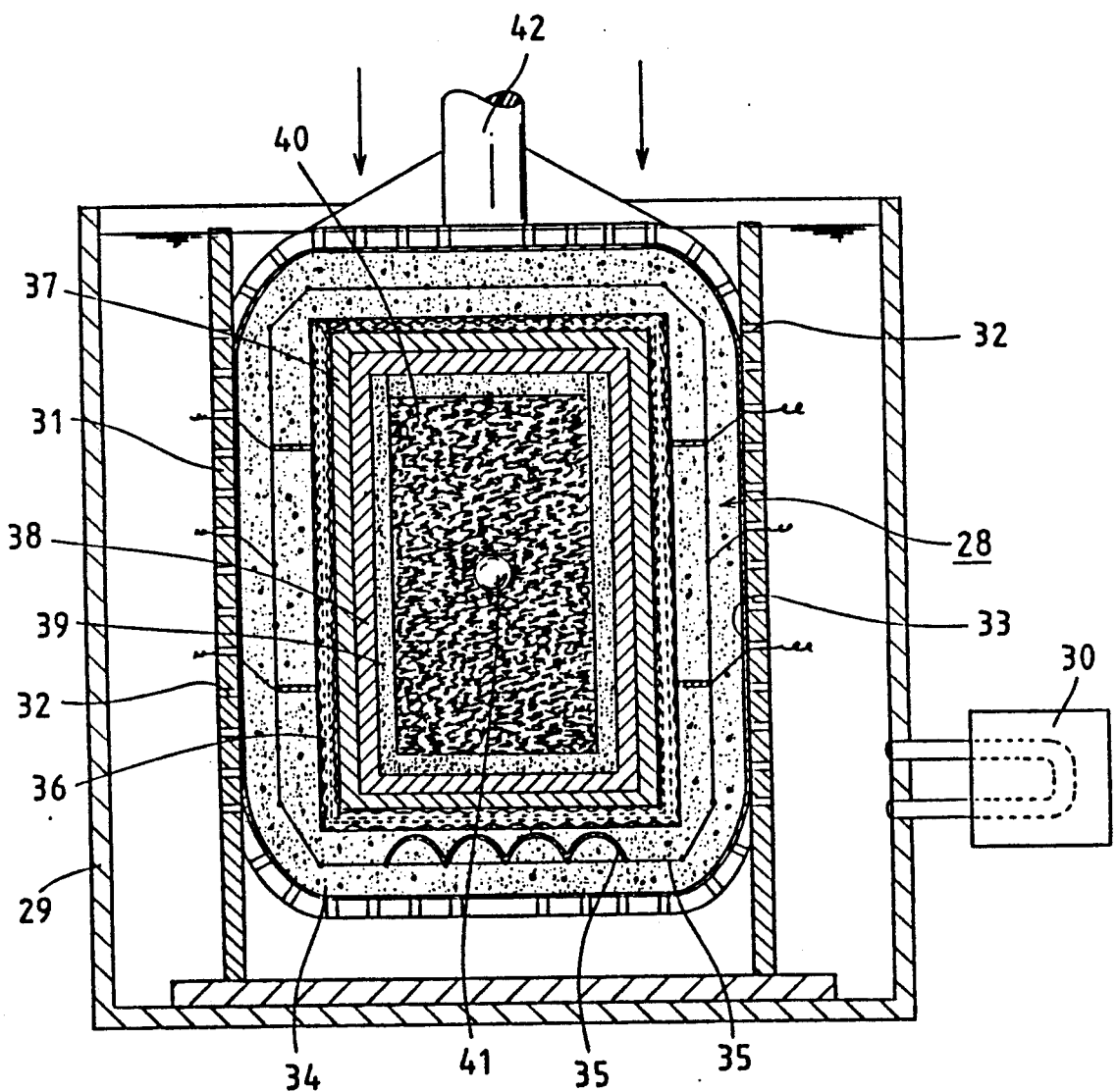
FIG. 8 illustrates, in vertical cross section, how a concrete block with a radioactive waste being sealed therein is manufactured.

When the waste 22 is of a radioactive substance, it can be treated for the safety sake according to the process of forming the concrete block 28 as shown in FIG. 8. To describe in detail, in FIG. 8 the reference numeral 29 shows a water tank; 30, a boiler; 31, a mold having a multiplicity of through-holes 32; 33, a ground fabric sheet made of glass or Kevlar cloth; and 34, a concrete manufactured by solidifying a fluidized cement containing one or more kinds of short fibers selected arbitrarily from a metal fiber, a glass fiber, a Kevlar chop, etc. as admixtures. In the process of manufacturing the above concrete, air is also introduced thereto from a pipe (not shown) and a high pressure is applied thereto by a press. The reference numeral 36 shows a lead coated cloth comprising a glass cloth on which a sufficient thickness of lead layer is formed by flame spraying; 37, a lead capsule; 38, a metal capsule; 39 a graphite capsule; 40, a waste such as radioactive substances or heavy metals; 41, a rubber ball for modulating the pressure of the waste contained in the concrete block 28; and 42, a press, the function and effect of which is substantially the same as in manufacturing the concrete block 25.

What is claimed is:

1. A concrete manufacturing process which comprises:
   pouring a fluidized cement containing a short fiber as an admixture into a concrete manufacturing mold;
   applying a predetermined level of pressure to the entire fluidized cement poured into said mold, while a gas is forcedly introduced into said cement; and
   hardening said cement as said gas introduced thereto forms bubbles which are vented into the atmosphere through a venting section provided for said mold said bubbles bursting when vented into said atmosphere thereby generating vibration which improves affinity between said short fiber and said cement.

2. A concrete manufacturing process which comprises:
   pouring a fluidized cement containing a short fiber as an admixture into a concrete manufacturing mold;
   applying predetermined levels of pressure to the entire fluidized cement poured into said mold, while a gas is forcedly introduced into said cement; and
   hardening said cement as said gas introduced thereto forms bubbles which are vented into the atmosphere through a venting section provided for said mold said bubbles bursting when vented into said atmosphere thereby generating vibration which improves affinity between said short fiber and said cement.

3. A concrete manufacturing process which comprises:
   pouring a fluidized cement containing a short fiber as an admixture into a concrete manufacturing mold;
   applying a predetermined level of pressure to the entire fluidized cement poured into said mold, while a gas is forcedly introduced into said cement;
   hardening said cement as said gas introduced thereto forms bubbles which are vented into the atmosphere through a venting section provided for said mold said bubbles bursting when vented into said atmosphere thereby generating vibration which improves affinity between said short fiber and said cement; and
   immersing said cement having been substantially hardened into a temperature-controlled liquid for a predetermined time.

4. A concrete manufacturing process which comprises:
   pouring a fluidized cement containing a short fiber as an admixture into a concrete manufacturing mold;
   applying a predetermined level of pressure to the entire fluidized cement poured into said mold, while a gas is forcedly introduced into said cement;
   hardening said cement as said gas introduced thereto forms bubbles which are vented through a venting section provided for said mold said bubbles bursting when vented into said atmosphere thereby generating vibration which improves affinity between said short fiber and said cement; and
   subjecting said cement having been substantially hardened to curing with steam fed into said concrete manufacturing mold for a predetermined time.

* * * * *